Nov. 20, 1934.  W. N. GLAB  1,981,230
VALVE
Filed Nov. 18, 1931
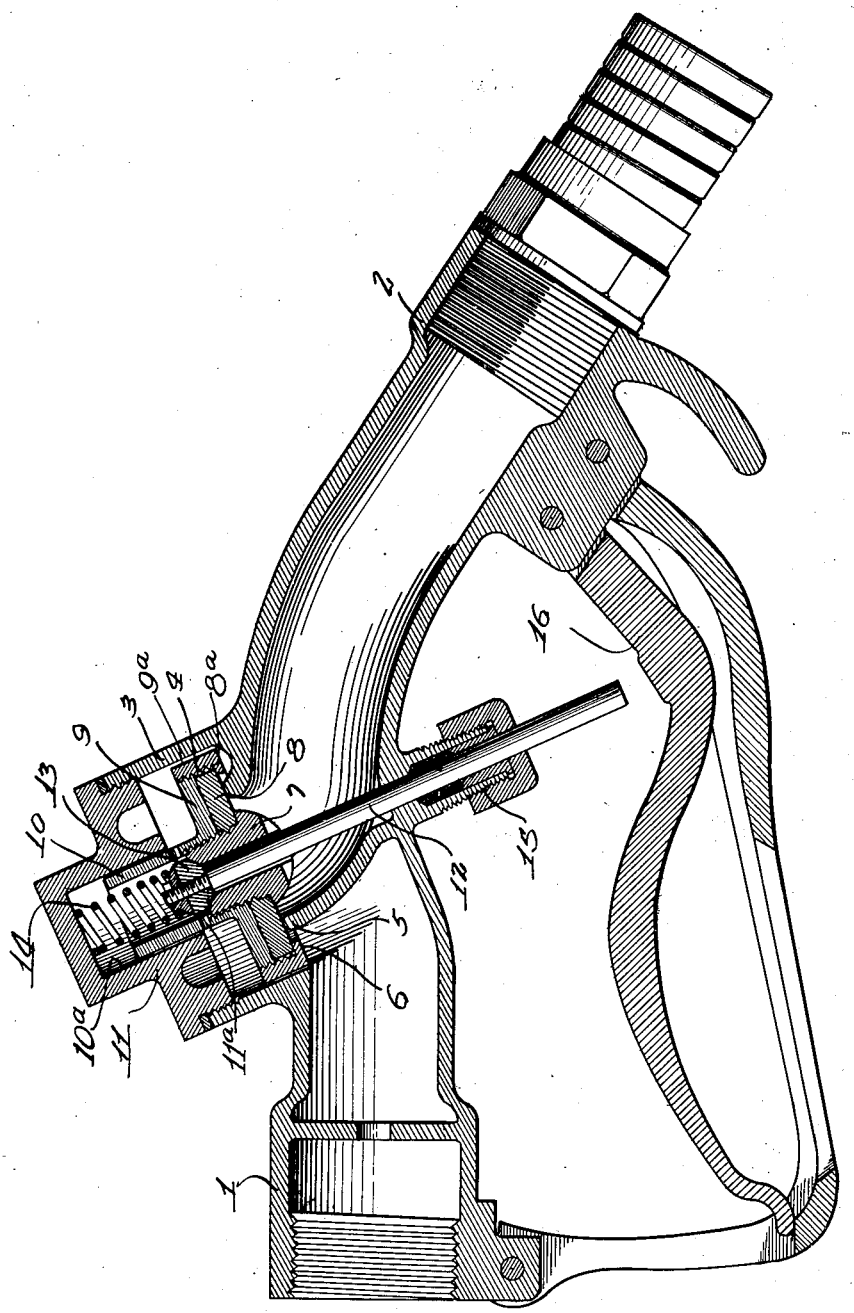
Inventor
William N. Glab.
by Charles[?] Attys.

Patented Nov. 20, 1934

1,981,230

UNITED STATES PATENT OFFICE 1,981,230

VALVE

William N. Glab, Dubuque, Iowa, assignor to Morrison Bros., Dubuque, Iowa, a corporation of Iowa Application November 18, 1931, Serial No. 575,719

2 Claims. (Cl. 137—139)

This invention relates to a valve primarily designed for use in connection with hose nozzles, but adapted for use in connection with other fluid dispensing devices.

It is an object of this invention to provide a valve structure in which the closing pressure acting upon the valve can be reduced to such an extent that the fluid pressure passing through the line will open the valve. Due to the particular arrangement, the valve will be gradually closed thereby eliminating the impact or water hammer as it is generally termed.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

The single figure in the drawing is a cross-sectional part elevational view through a hose nozzle equipped with a valve structure embodying this invention.

In connection with this invention, there has been illustrated a hose nozzle comprising an inlet portion 1 and an outlet portion 2. Between the inlet portion 1 and the outlet portion 2, there is a valve housing, generally denoted by the reference numeral 3, which in effect defines a cylindrical wall. Within the valve housing there is a main piston valve 4 which is seated upon a valve seat extending from the outlet portion of the nozzle. This seat 5 is however so proportioned as to leave a passage 6 for the fluid that enters through the inlet part to emerge into the valve housing when the valve is elevated as will later more fully appear.

The valve consists of a hub portion 7 provided with a lower disc seating member 8 and an upper disc member 9 which terminates in a cylindrical extension or hollow stem 10. The outer edge of the member 8 is engaged by an inwardly extending flange 8a of an annular ring member 9a which surrounds the disc members 8 and 9 and is in threaded engagement with the latter. This ring extends outwardly substantially to the housing wall, the clearance between the ring and wall being sufficiently small to enable the valve to function as a piston and at the same time permit a slight amount of leakage past the valve.

Upon the valve housing 3, there is a removable cover 11 having a cylindrical chamber or socket 10a for slidably receiving the cylindrical portion 10. Communication is established between the space above the main valve, when the main valve is seated, and the interior of the cylindrical portion 10 by means of port openings 11a in the wall of the cylindrical portion. The total area of these openings should be large enough to enable fluid to pass from the upper side of the main valve into the cylindrical portion 10 at a greater rate than the leakage around the valve. It will be observed that these openings are so positioned that they will be closed by the wall of the cylindrical chamber or socket 10a before the valve reaches its uppermost open limit, whereby, as the valve reaches fully opened position, its movement will be checked with a cushioning effect.

A valve rod 12 extends freely through the hub member 7 of the valve. This valve rod 12 is provided with a spherical abutment or auxiliary valve 13 at its upper end which is within the cylindrical portion 10 and contacts or is seated in a depression in the top of the hub member 7. A coil spring 14 which is compressed between the top of the cover or cap 11 and the abutment 13 normally urges the valve against its seat 5. The valve rod 12 extends through the nozzle and through a stuffing box 15 which is located upon the opposite side of the nozzle from the valve housing. A lever 16 is pivoted to the valve housing and is adapted for engaging the valve stem 12 for actuating the same when it is desired to open the valve.

The operation of this hose nozzle is as follows:

Normally, the main valve is sealed in closed position. Due to the leakage past the valve, inlet pressure will be established on the upper surface of the valve. This surface being greater than the under surface acted on by the inlet pressure, the valve will be sealed in closed position. Moreover, the spring 14 additionally aids in maintaining the valve closed.

When it is desired to open the main valve, the operator actuates the lever 16 to push the valve stem 12 upwardly and compress the spring 14 which is thereby rendered ineffective relative to the main valve. This operation also opens the auxiliary valve 13, whereby the pressure above the main valve is relieved through the port openings 11a, the clearance space between the stem 12 and the hub 7, and thence to the outlet 5 of the nozzle, which is at atmospheric pressure. Since the forces acting on the underside of the main valve are now greater than those acting on the upper side, the valve will move to open position and permit the flow of fluid from the inlet side to the outlet side of the nozzle. After sufficient fluid has been passed through the nozzle for any particular purpose and it is desired to close the valve, the operator will release the lever 16 to close the valve. Of course, the action of the spring 14 in closing the valve is opposed by the pressure of the fluid in the nozzle. This pressure in the nozzle is gradually overcome by the spring 14 with the result that all shocks and water hammer are avoided.

In the event that the fluid pressure in the nozzle is not sufficient to lift the valve when the spring 14 is depressed, a collar or abutment may be used in connection with the valve stem for positively engaging the valve and lifting the same.

It will of course be appreciated that the tension of the spring 14 must be of such a character as to overcome the pressure of the fluid in the nozzle for effectively closing the valve.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A valve body having means defining an inlet and an outlet therefor, and having an upwardly extending annular wall fitted with a removable cap to define a fluid chamber communicating with the inlet and with the outlet, an annular partition in said body providing a seat for a main valve and being positioned relative to said wall to provide a port for the flow of fluid from the inlet to the chamber, a main valve member in said chamber and adapted to engage said seat, said valve member being cooperable with said wall and with said partition to overlie the inlet port when said valve is in its closed position, said cap being bored to provide an auxiliary fluid chamber and a valve guide, a tubular member entered guidedly slidable in said bore and having side ports cooperable with a wall of said bore to provide a first auxiliary valve, said tubular member being secured to and movable with said main valve member whereby said side ports are open for communication with said restricted port when the main valve is closed and are closed when the main valve is open, said main valve member having a central bore and having means defining a seat for a second auxiliary valve, a second auxiliary valve seated on said main valve member to close the bore thereof, said second auxiliary valve being guided in said tubular member, a rod connected to said second auxiliary valve and extending through a wall of the valve body, and a spring positioned engaging said second auxiliary valve member adapted to urge said second auxiliary valve and said main valve to closed position.

2. A valve body having means defining an inlet and an outlet therefor, and having an upwardly extending annular portion provided with a closure member defining a fluid chamber communicating with the inlet and with the outlet, an annular partition in said body providing a seat for a main valve and being positioned relative to said annular extending portion to provide a port for the flow of fluid from the inlet to said chamber, a main valve member in said chamber and adapted to engage said seat and being positioned relative to a wall of said extending portion and to said partition to obstruct the inlet port when in closed position, said main valve member having a central bore and being provided with means to form a seat for an auxiliary valve, an auxiliary valve in said chamber adapted to seat on said main valve member to close the bore thereof, an operating rod connected to said auxiliary valve member and extending through a wall of said valve body, said closure member being provided with a bore, means slidable in said bore providing a guide for said auxiliary valve, and a spring positioned between said closure member and said auxiliary valve to urge said main and said auxiliary valves to closed position.

WILLIAM N. GLAB.